United States Patent
Kitson et al.

(10) Patent No.: US 7,106,410 B2
(45) Date of Patent: *Sep. 12, 2006

(54) BISTABLE NEMATIC LIQUID CRYSTAL DEVICE COMPRISING AN ARRAY OF UPSTANDING ALIGNMENT POSTS

(75) Inventors: Stephen Christopher Kitson, South Gloucestershire (GB); Adrian Derek Geisow, N. Somerset (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/100,372

(22) Filed: Apr. 6, 2005

(65) Prior Publication Data

US 2005/0174519 A1    Aug. 11, 2005

Related U.S. Application Data

(63) Continuation of application No. 09/816,942, filed on Mar. 23, 2001, now Pat. No. 6,903,790.

(30) Foreign Application Priority Data

Mar. 27, 2000    (EP) .................................. 00302479

(51) Int. Cl.
*G02F 1/1337*    (2006.01)

(52) U.S. Cl. ...................... 349/191; 349/130; 349/123; 349/134

(58) Field of Classification Search ................ 349/129, 349/191, 94, 123–125, 130, 134
See application file for complete search history.

(56) References Cited

U.S. PATENT DOCUMENTS

| | | | |
|---|---|---|---|
| 3,694,053 A * | 9/1972 | Kahn | 349/129 |
| 4,232,947 A | 11/1980 | Funada et al. | 350/341 |
| 4,333,708 A | 6/1982 | Boyd et al. | |
| 4,893,907 A | 1/1990 | Mallison | |
| 5,109,293 A | 4/1992 | Matsunaga et al. | 359/76 |
| 5,327,271 A | 7/1994 | Takeuchi et al. | |
| 5,552,611 A | 9/1996 | Enichen | |
| 5,574,593 A | 11/1996 | Wakita et al. | |
| 5,751,382 A | 5/1998 | Yamada et al. | |
| 5,754,264 A | 5/1998 | Bryan-Brown et al. | |
| 5,872,611 A | 2/1999 | Hirata et al. | |
| 5,917,570 A * | 6/1999 | Bryan-Brown et al. | 349/129 |
| 6,067,141 A | 5/2000 | Yamada et al. | |
| 6,236,445 B1 | 5/2001 | Foschaar et al. | |
| 6,266,122 B1 | 7/2001 | Kishimoto et al. | |
| 6,297,865 B1 * | 10/2001 | Matsui et al. | 349/123 |

(Continued)

FOREIGN PATENT DOCUMENTS

EP    000768560    10/1995

(Continued)

OTHER PUBLICATIONS

G.P. Bryan-Brown, E.L. Wood and I.C. Sage; NATURE, vol. 399, p. 338; 1999.

(Continued)

*Primary Examiner*—Dung T. Nguyen
*Assistant Examiner*—Thoi V. Duong (57) ABSTRACT

A bistable nematic liquid crystal device includes an array of upstanding features (10) on at least one cell wall (2). The features (10) have a shape and/or orientation to induce the liquid crystal director adjacent the features (10) to adopt two different tilt angles in substantially the same azimuthal direction. The arrangement is such that two stable liquid crystal molecular configurations can exist after suitable electrical signals have been applied to the electrodes (12, 14).

26 Claims, 6 Drawing Sheets

U.S. PATENT DOCUMENTS

| | | | |
|---|---|---|---|
| 6,327,016 B1 | 12/2001 | Yamada et al. | 349/160 |
| 6,456,348 B1 * | 9/2002 | Bryan-Brown et al. | 349/129 |
| 6,519,018 B1 | 2/2003 | Samant | 349/130 |
| 6,549,256 B1 | 4/2003 | Bryan-Brown et al. | |
| 6,714,273 B1 | 3/2004 | Bryan-Brown et al. | 349/129 |
| 2005/0062919 A1 | 3/2005 | Bryan-Brown et al. | 349/123 |

FOREIGN PATENT DOCUMENTS

| | | |
|---|---|---|
| EP | 1 094 103 | 4/2001 |
| GB | 2 286 467 | 8/1995 |
| GB | 2 290 629 | 1/1996 |
| JP | 56138712 | 10/1981 |
| JP | 02211422 | 8/1990 |
| JP | 05053513 | 3/1993 |
| JP | 05088177 | 4/1993 |
| JP | 5-249463 | 9/1993 |
| JP | 10148827 | 6/1998 |
| JP | 11311789 | 11/1999 |
| JP | 2000206535 | 7/2000 |
| WO | WO 91/11747 | 8/1991 |
| WO | WO 92/00546 | 1/1992 |
| WO | WO 96/24880 | 8/1996 |
| WO | WO 97/14990 | 4/1997 |
| WO | WO 99/34251 | 7/1999 |
| WO | WO 01/40853 | 6/2001 |

OTHER PUBLICATIONS

Yamamoto et al. "Pretilt angle control of liquid-crystal alignment by using projections on subtrate surfaces of dual-domain TN-LCD", J. SID, Apr. 2, 1996.

J. Cognard "Alignment of Nematic Liquid Crystals and Their Mixtures", Mol. Crys. Liq. Crys. 1-78 (1982) Supplement 1.

D.W. Berreman "The Alignment of Liquid Crystlas by Grooved Surfaces", Mol. Cryst. Liq. Crys. 23 215-231 1973.

Cheng et al. "The liquid crystal alignment properties of photolithographic gratings", *Appl. Phys. Lett.* 35(6) Sep. 15, 1979.

Thurston et al. "Mechanically Bistable Liquid Crystal Display Structures", IEEE Trans. Electronic Devices, pp. 2069-2080, 1980.

* cited by examiner

BISTABLE NEMATIC LIQUID CRYSTAL DEVICE COMPRISING AN ARRAY OF UPSTANDING ALIGNMENT POSTS

CROSS-REFERENCE TO RELATED APPLICATION

The present application is a continuation of U.S. patent application No. 09/816,942, filed on Mar. 23, 2001.

FIELD OF THE INVENTION

This invention relates to bistable nematic liquid crystal devices.

BACKGROUND OF THE INVENTION

Liquid crystal devices typically comprise a pair of opposed, spaced-apart translucent cell walls with liquid crystal ("LC") material between them. The cell walls have transparent electrode patterns for applying fields to align the LC material.

Liquid crystal (LC) materials are rod-like or lath-like molecules which have different optical properties along their long and short axes. The molecules exhibit some long range order so that locally they tend to adopt similar orientations to their neighbours. The local orientation of the long axes of the molecules is referred to as the director. When the director is orientated perpendicular to the plane of the cell walls, this is referred to as homeotropic alignment. Alignment of the director along the plane of the cell walls or at an angle to the plane of the cell walls is referred to respectively as planar homogeneous and tilted homogeneous alignment.

There are three types of LC materials: nematic, cholesteric (chiral nematic), and smectic. The present invention concerns devices using nematic LC materials, which may optionally be chiral or chirally doped.

Typical LC displays which employ nematic LC materials are monostable, application of an electric field causing the LC molecules to align in an "on" state, and removal of the electric field permitting the LC molecules to revert to a pre-determined "off" state. Examples of such monostable modes are twisted nematic (TN), supertwisted nematic (STN) and hybrid aligned nematic (HAN) modes. Each "on" pixel must be maintained above an electric field threshold, which can cause problems in the matrix addressing of complex displays. These problems can be overcome by driving each pixel by a thin film transistor (TFT), but manufacturing large area TFT arrays is difficult and adds to manufacturing costs.

A number of bistable LC devices have been proposed in which a nematic LC has more than one stable orientation of the director, and can be switched between two stable states when addressed by suitable waveforms.

U.S. Pat. No. 4,333,708 discloses a multistable LC device in which switching between stable configurations is by the movement of disclinations in response to electric fields.

In WO 91/11747 and WO 92/00546 it is proposed to provide a bistable surface by careful control of the thickness and evaporation of SiO coatings. A first stable planar orientation of the director could be obtained, and a second stable orientation in which the director is at an azimuthal angle (in the plane of the surface) of 90° to the first orientation in the plane of the surface, and tilted by around 30°.

It has been proposed, in GB 2,286,467, to achieve an azimuthal bistable surface by using a bigrating surface in which the director is planar to the surface and two surface orientations are stabilised by precise control of the dimensions of the grating.

In "Mechanically Bistable Liquid-Crystal Display Structures", R N Thurston et al, IEEE Trans. on Elec. Devices, Vol. ED-27, No. 11, November 1980, there are described two bistable nematic LC modes which are called "vertical-horizontal" and "horizontal-horizontal". In the vertical-horizontal mode, both cell walls are treated to give a roughly 45° tilt which permits the directors to be switched between two states in a plane which is perpendicular to the major surfaces of the device. In the horizontal-horizontal mode, the director is switchable between two angles in a plane parallel to the major surfaces of the device.

WO 97/14990 and WO 99/34251 describe the use of a monograting surface with a homeotropic local director, which has two stable states with different tilt angles within the same azimuthal plane. The homeotropic alignment is achieved by creating the monograting in a layer of material which causes spontaneous homeotropic orientation or, more practically, by coating the grating surface with a homeotropic inducing alignment agent such as lecithin.

We have now found that a bistable nematic LC device may be constructed using an array of features which are shaped so as to permit the director to adopt either of two tilt angles in substantially the same azimuthal direction. The cell can be switched between the two tilt states by an applied electric field to display information which can persist after the removal of the field.

The term "azimuthal direction" is used herein as follows. Let the walls of a cell lie in the x, y plane, so that the normal to the cell walls is the z axis. Two tilt angles in the same azimuthal direction means two different director orientations in the same x, z plane, where x is taken as the projection of the director onto the x, y plane.

SUMMARY OF THE INVENTION

According to an aspect of the present invention there is provided a bistable nematic liquid crystal device comprising:

a first cell wall and a second cell wall enclosing a layer of nematic liquid crystal material;

electrodes for applying an electric field across at least some of the liquid crystal material;

a surface alignment on the inner surface of at least the first cell wall providing alignment to the liquid crystal molecules;

wherein the surface alignment comprises an array of features which have a shape and/or orientation to induce the director adjacent the features to adopt two different tilt angles in substantially the same azimuthal direction;

the arrangement being such that two stable liquid crystal molecular configurations can exist after suitable electrical signals have been applied to the electrodes.

We have surprisingly found that the orientation of the director is induced by the geometry of the features, rather than by the array or lattice.

In a preferred embodiment, the features comprise a plurality of upstanding posts. The features could also comprise mounds, pyramids, domes, walls and other promontories which are shaped or orientated to permit the LC director to adopt one of two different tilt angles in substantially the same azimuthal direction. The invention will be described for convenience hereinafter with respect to posts; however it is to be understood that the invention is not limited to this embodiment. The posts may have substantially straight sides, either normal or tilted with respect to the major planes of the device, or the posts may have curved or irregular surface shape or configuration.

The director tends to align locally in an orientation which depends on the specific shape of the post. For an array of square posts, the director may align along either of the two diagonals of the posts. If another shape is chosen, then there may be more than two azimuthal directions, or just one. For example an equilateral triangular post can induce three directions substantially along the angle bisectors. An oval or diamond shape, with one axis longer than the others, may induce a single local director orientation which defines the azimuthal direction. It will be appreciated that such an orientation can be induced by a very wide range of post shapes. Moreover, by tilting a square post along one of its diagonals it is possible to favour one direction over another. Similarly, tilting of a cylindrical post can induce an alignment in the tilt direction.

Because the local director orientation is determined by the geometry of the posts, the array need not be a regular array. In a preferred embodiment, the posts are arranged in a random or pseudorandom array instead of in a regular lattice. This arrangement has the benefit of eliminating diffraction colours which may result from the use of regular structures. Such an array can act as a diffuser, which may remove the need for an external diffuser in some displays. Of course, if a diffraction colour is desired in the display, the array may be made regular, and the posts may be spaced at intervals which produce the desired interference effect. Thus, the structure may be separately optimised to give the required alignment and also to mitigate or enhance the optical effect that results from a textured surface.

The posts may be formed by any suitable means; for example by photolithography, embossing, casting, injection moulding, or transfer from a carrier layer. It is not necessary to treat the posts with a coating to induce homeotropic alignment.

In one embodiment some degree of twist is induced in the LC director, which may improve the optical characteristics of the device. The twist may be induced by using LC materials which are chiral or which have been chirally doped. Additionally, or alternatively, twist may be induced by treating the inner surface of the second cell wall to induce a planar or tilted planar alignment which is at a non-zero angle with respect to the azimuthal direction induced by the features on the first cell wall.

The second cell wall is preferably treated to induce a homeotropic local alignment, which may be achieved by well known surface treatments such as lecithin or a chrome complex. In this mode, it is also desirable to use a nematic LC of negative dielectric anisotropy, to facilitate switching from a lower energy high tilt state to a higher energy low tilt state. However, we have found that a planar alignment also permits bistable switching between optically distinct states. The planar alignment was achieved using a monograting on the second surface, with the grooves aligned parallel with the preferred direction on the other surface. Nematic liquid crystals of positive dielectric anisotropy can also be used. For convenience, the invention will be described hereinafter with reference to a homeotropic alignment on the second cell wall, but it is to be understood that the invention is not limited to this embodiment.

In use, the device will be provided with means for distinguishing between switched states of the liquid crystal material. For example a polariser and an analyser may be mounted either side of the LC cell in a manner well known to those skilled in the art of LCD manufacture. Between crossed polarisers, the high tilt state appears dark and the low tilt state appears bright because of its increased birefringence. Alternatively, a pleochroic dye may be dissolved in the LC material, and a single polariser may optionally be mounted on the cell. However, the device may be manufactured and sold without polarisers or other distinguishing means.

The posts may be of any height which permits the LC material to adopt two different tilt states. These heights will differ with different LC materials and cell characteristics. A preferred height range is 0.5 to 5 µm, notably 0.9 to 1.3 µm (for a cell gap of about 3 µm. If the posts are too low, planar orientation will tend to predominate, whilst if the posts are too tall, a high tilt or homeotropic orientation will predominate.

The posts may be of any convenient width (size). A preferred width range is 0.2 to 3 µm. The posts are preferably spaced apart from each other by between 0.1 and 5 µm.

The posts may be provided on one cell wall only, or they may optionally be provided on both cell walls.

The alignment posts may optionally be interspersed with taller posts for providing cell spacing.

The cell walls may be formed from glass, or from a rigid or non-rigid plastics material, for example PES, PET, PEEK, or polyamide.

It is preferred that one electrode structure (typically a transparent conductor such as indium tin oxide) is provided on the inner surface of each cell wall in known manner. For example, the first cell wall may be provided with a plurality of "row" electrodes and the second cell wall may be provided with a plurality of "column" electrodes. However, it would also be possible to provided planar (interdigitated) electrode structures on one wall only, preferably the first cell wall.

The inner surface of the second cell wall could have low surface energy so that it exhibits little or no tendency to cause any particular type of alignment, so that the alignment of the director is determined essentially by the features on the first cell wall.

However, it is preferred that the inner surface of the second cell wall is provided with a surface alignment to induce a desired alignment of the local director. This alignment may be homeotropic, planar or tilted. The alignment may be provided by an array of features of suitable shape and/or orientation, or by conventional means, for example rubbing, photoalignment, a monograting, or by treating the surface of the wall with an agent to induce homeotropic alignment.

The shape and/or orientation of the features is preferably such as to favour only one azimuthal director orientation adjacent the features. The orientation may be the same for each feature, or the orientation may vary from feature to feature so as to give a scattering effect in one of the two states.

BRIEF DESCRIPTION OF THE DRAWINGS

The invention will now be further described by way of example, with reference to the following drawings in which.

DETAILED DESCRIPTION

Figure 2:
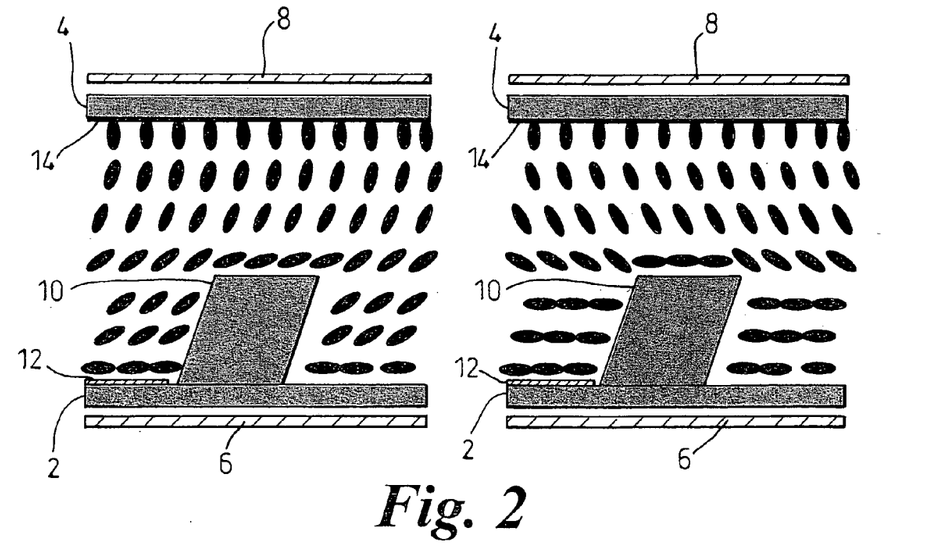
FIG. 2 shows schematic views of a cross section through a single post and the surrounding LC of a bistable nematic device in accordance with one aspect of the present invention, along one of the diagonals of a post, in different states.

The bistable nematic cell shown schematically in FIG. 2 comprises a first cell wall 2 and a second cell wall 4 which enclose a layer of nematic LC material of negative dielectric anisotropy. The molecules of the LC are represented as ellipses, with the long axis indicating the local director. The inner surface of each cell wall is provided with a transparent electrode pattern, for example row electrodes 12 on the first cell wall 2 and column electrodes 14 on the second cell wall 4, in a known manner.

The inner surface of the first cell wall 2 is textured with a regular array of square posts 10, and the inner surface of the second cell wall 4 is flat. The posts 10 are approximately 1 μm high and the cell gap is typically 3 μm. The flat surface is treated to give homeotropic alignment. The posts are not homeotropically treated.

Figure 1:
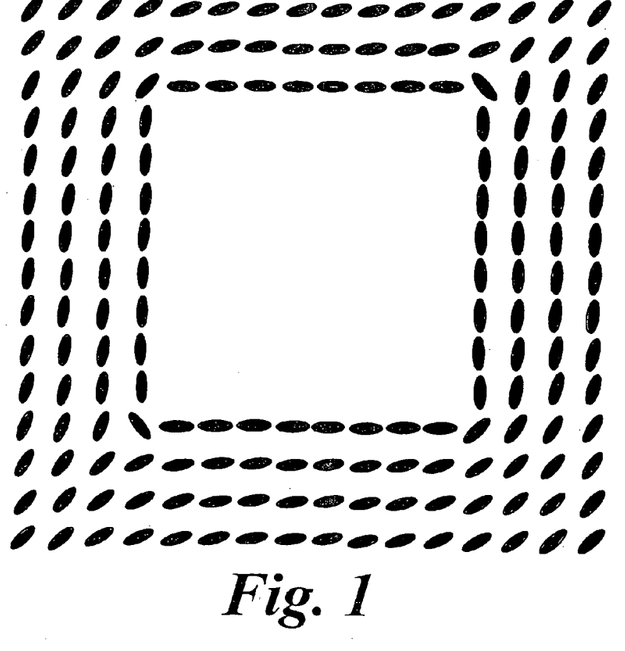
FIG. 1 is a schematic cross section through a single post and the surrounding LC in accordance with the present invention. The cross section is in the x, y plane. The ellipses represent the LC molecules with the long axis corresponding to the local director.

Such an array of square posts has two preferred alignment directions in the azimuthal plane. These are along the two diagonals of the post. FIG. 1 shows a cross-section through a post with the LC distorted around it, from one corner to the diagonally opposite one. This alignment around the post then tends to seed the alignment of the LC above the post such that the average orientation is also along that diagonal.

By tilting the posts along one of the diagonals (FIG. 2) it is possible to favour that alignment direction. Through computer simulation of this geometry we found that although there is only one azimuthal alignment direction there are in fact two states with similar energies but which differ in how much the LC tilts. FIG. 2 is a schematic of the two states. In one state (shown on the left of FIG. 2) the LC is highly tilted, and in the other it is planar around the posts. The exact nature of the LC orientation depends on the details of the structure, but for a range of parameters there are two distinct states with different magnitudes of tilt away from the cell normal. The two states may be distinguished by viewing through a polariser 8 and an analyser 6. The low tilt state has high birefringence and the high tilt state has low birefringence. Tilting the posts sufficiently along the diagonal also serves to eliminate reverse tilt states. Preferably the posts are tilted by at least 5°, depending on the nature of the LC and the cell gap.

Without limiting the scope of the invention in any way, we think that the two states may arise because of the way in which the LC is deformed by the post. Flowing around a post causes regions of high energy density at the leading and trailing edges of the post where there is a sharp change in direction. This can be seen in FIG. 1 at the bottom left and top right corners of the post. This energy density is reduced if the LC molecules are tilted because there is a less severe direction change. This is clear in the limit of the molecules being homeotropic throughout the cell. In that case there is no region of high distortion at the post edges. In the higher tilt state this deformation energy is therefore reduced, but at the expense of a higher bend/splay deformation energy at the base of the posts. The LC in contact with the flat surface between posts is untilted but undergoes a sharp change of direction as it adopts the tilt around the post.

In the low tilt state the energy is balanced in the opposite sense, with the high deformation around the leading and trailing edges of the post being partially balanced by the lack of the bend/splay deformation at the base of the post because the tilt is uniform around the post. Our computer simulations suggest that, for the current configuration, the higher tilt state is the lower energy state.

This is supported by the results of computer simulation and in actual cells. When viewed at an appropriate angle between crossed polarisers the cells always cool into the darker of the two states. From FIG. 2 it would appear that the high tilt state will have lower birefringence and therefore appear darker than the low tilt state. The exact amount of tilt in the high tilt state will be a function of the elastic constants of the LC material and the planar anchoring energy of the post material.

Figure 3:
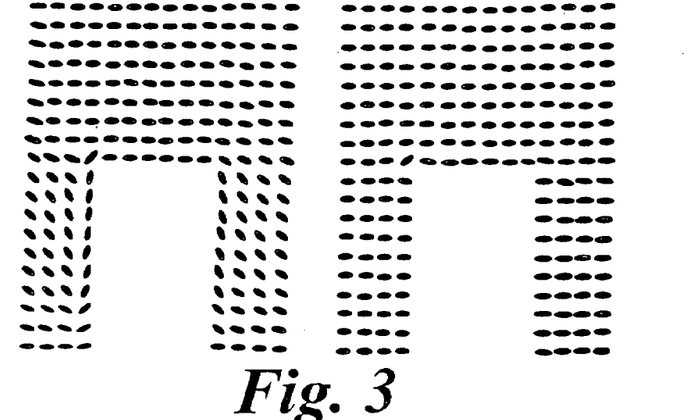
FIG. 3 shows schematic views of a cross section through a single post and the surrounding LC of a bistable nematic device in accordance with another aspect of the present invention, along one of the diagonals of a post, in different states.

Referring now to FIG. 3, there is shown a computer-generated model of LC alignment around a square post similar to that shown in FIG. 2, but with the inner surface of the second cell wall treated to give planar alignment. In the state shown in the left in FIG. 3, the local director is highly tilted, and in the other it is planar around the posts. As with the cell of FIG. 2, switching between the two states is achieved by the application of suitable electrical signals.

Figure 4:
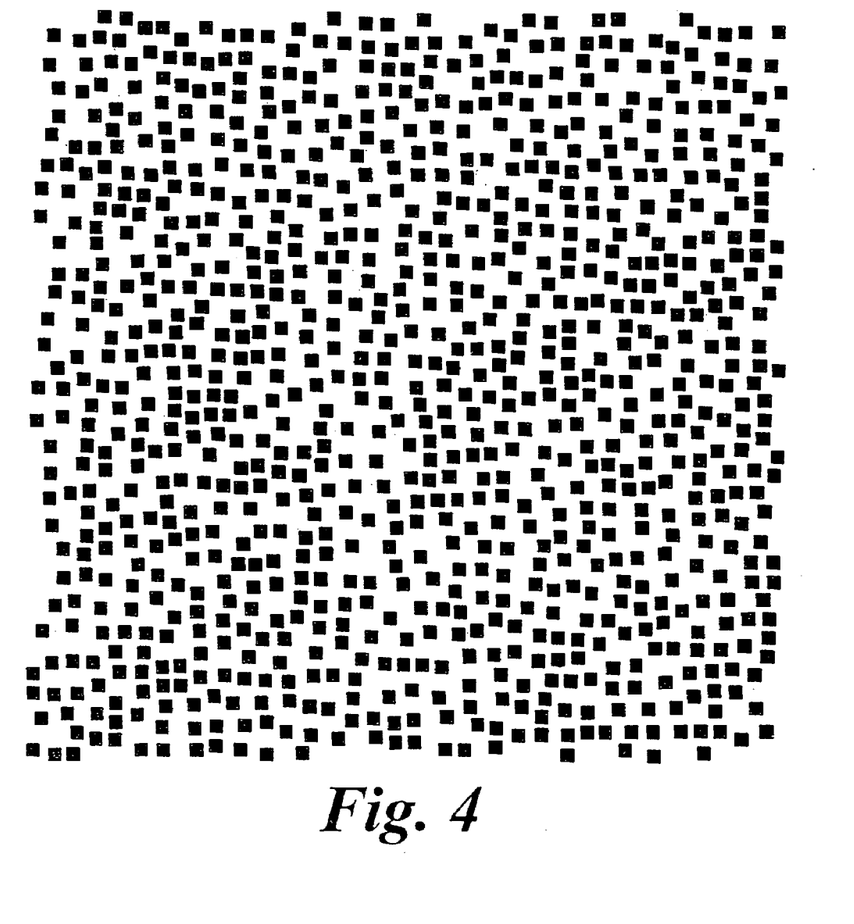
FIG. 4 is a plan view of a unit cell of a device in accordance with the present invention, having posts in a pseudorandom array.

FIG. 4 shows a pseudorandom array of posts for an alternative embodiment of the invention, which provides bistable switching without interference effects. Each square post is about 0.8×0.8 μm, and the pseudorandom array has a repeat distance of 56 μm.

Cell Manufacture

A clean glass substrate 2 coated with Indium Tin Oxide (ITO) was taken and electrode patterns 12 were formed using conventional lithographic and wet etch procedures. The substrate was spin-coated with a suitable photoresist (Shipley S1813) to a final thickness of 1.3 μm.

A photomask (Compugraphics International PLC) with an array of suitably-dimensioned square opaque regions in a square array, was brought into hard contact with the substrate and a suitable UV source was used to expose the photoresist for 10 s at ⁻100 mW/cm². The substrate was developed using Microposit Developer diluted 1:1 with deionised water for approximately 20 s and rinsed dry. The substrate was flood exposed using a 365 nm UV source for 3 minutes at 30 mW/cm², and hardbaked at 85° C. for 12 hours. The substrate was then deep UV cured using a 254 nm UV source at ⁻50 mW/cm² for 1 hour. By exposing through the mask using a UV source at an offset angle to the normal to the plane of the cell wall, tilted posts could be produced. The tilt angle (or blaze angle) is related to the offset angle by Snell's law. Exposure to the developer will also affect the shape of the posts.

A second clean ITO substrate 4 with electrode patterns 14 was taken and treated to give a homeotropic alignment of the liquid crystal using a stearyl-carboxy-chromium complex, in a known manner.

An LC test cell was formed by bringing the substrates together using suitable spacer beads (Micropearl) contained in UV curing glue (Norland Optical Adhesives N73) around the periphery of the substrates 2, 4, and cured using 365 nm UV source. The cell was capillary filled with a nematic liquid crystal mixture (Merck ZLI 4788-000). Methods of spacing, assembling and filling LC cells are well known to those skilled in the art of LCD manufacture, and such conventional methods may also be used in the spacing, assembling and filling of devices in accordance with the present invention.

Experimental Results

Figure 5:
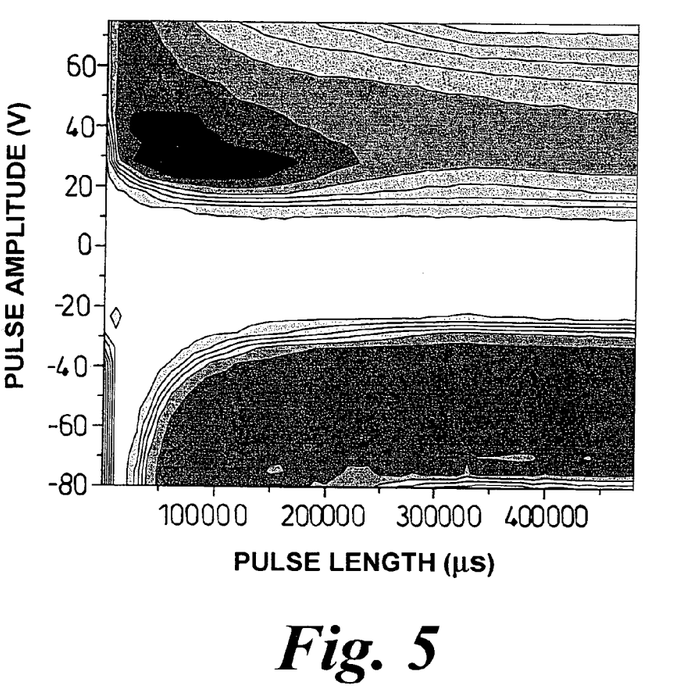
FIGS. 5 and 6 show change in transmission of an experimental cell in accordance with the invention, as a function of pulse length and amplitude, for switching between two states.
Figure 6:
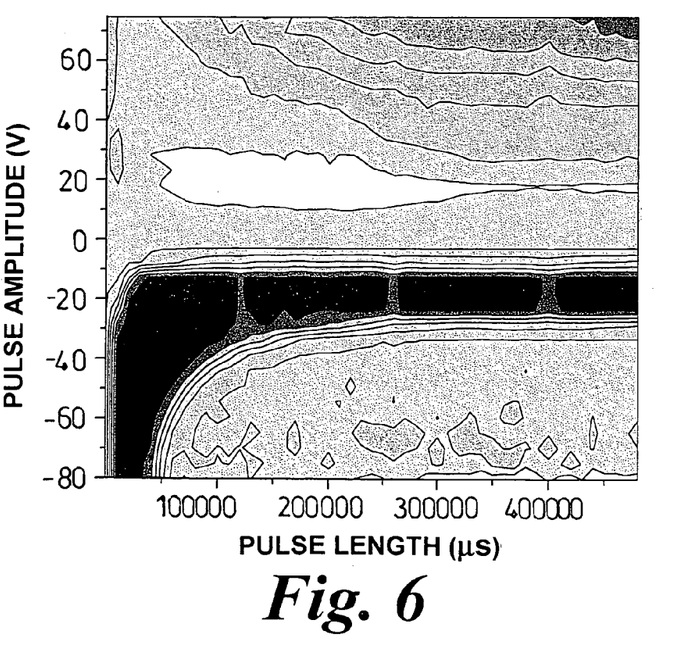

FIGS. 5 and 6 show the switching response of a bistable cell recorded at 42.5° C. The cell had the following characteristics:

spacing: 3 μm
post height: 1.4 μm
gap between posts: 0.7 μm
offset angle: 12°
LC: ZLI 4788-000 (Merck) doped with 3% N65 (Norland).

It was found that adding a small quantity of surfactant oligomer to the LC improved the switching. It is known that switching in conventional LC devices can be improved by addition of surfactant oligomers to the LC. See, for example, G P Bryan-Brown, E L Wood and I C Sage, *Nature* Vol. 399 p 338 1999. We doped the LC with N65 UV-curable glue (from Norland) and cured it while in the isotropic phase. The doped LC was then mass filtered to remove the longer chain lengths. We found that adding 3% by weight of N65 to the LC was optimum.

DC balanced monopolar pulses were applied to the cell and the effect on the transmission was recorded. Each test pulse was of an amplitude V and a duration τ, and was followed by another pulse of opposite polarity but with an amplitude about 5% of V, but a duration 20 times longer. The second pulse was too small to cause switching but did prevent a build up of charge in the cell after many test pulses. FIGS. 5 and 6 show the change in transmission as a function of the pulse length and amplitude. FIG. 5 shows results for switching from the high energy state to the low energy state, and FIG. 6 shows results for switching in the opposite direction. Black indicates that the transmission had changed so that the cell is switched. White indicates no change in transmission so that no switching has occurred.

Switching from the high energy state to the low energy state is generally sign independent indicating that in this direction switching is taking place via the dielectric anisotropy. Switching in the other direction is sign dependent indicating that the switching is mediated by a linear electro-optic effect. We believe this is likely to be the flexoelectric effect. In FIG. 5, the non-switching region coincides with the switching region in FIG. 6. This suggests that switching from the high energy state to the low energy state is impeded by the flexoelectric effect.

In a series of further experiments we have varied the cell parameters to go some way towards optimising the switching characteristics of the device. A preferred cell structure is: cell gap 3 μm; post size 1 μm; offset angle 5° along one of the diagonals of the post; 1.1 μm coating of s1813; N65 initial concentration 3%.

SEM Studies of Post Arrays

Figure 7:
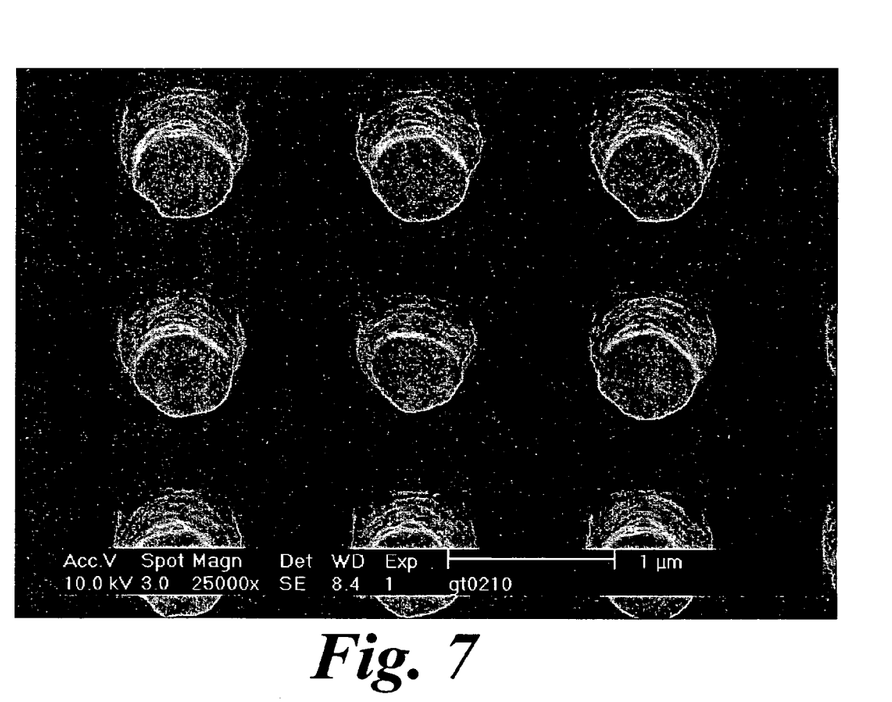
FIGS. 7 to 10 are SEM photomicrographs of arrays of posts used in the manufacture of liquid crystal devices in accordance with the invention.
Figure 8:
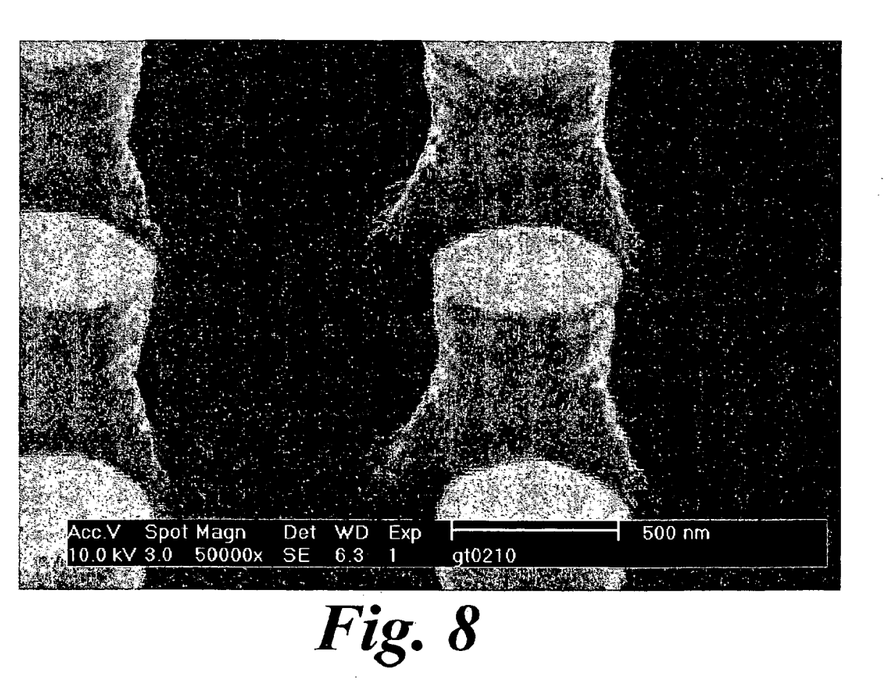
Figure 9:
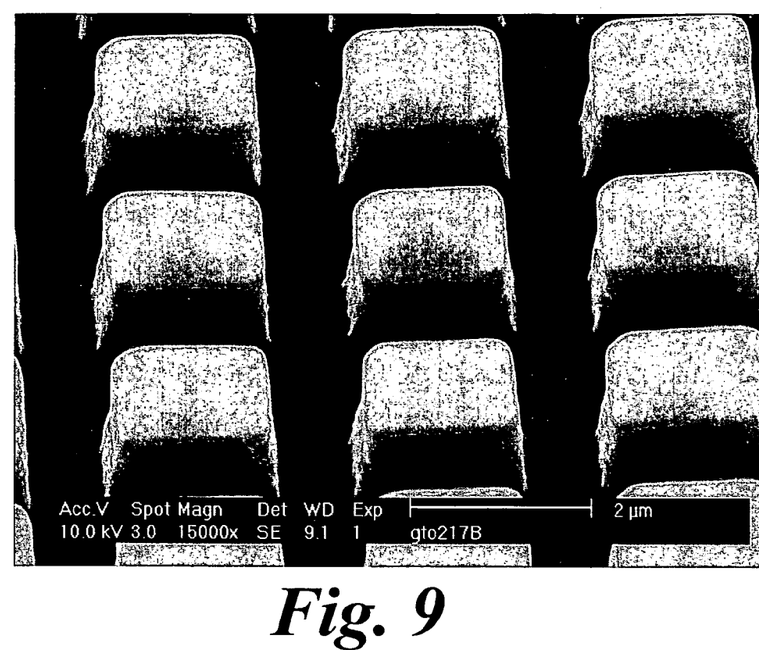

SEMs of experimental post arrays formed using masks with square holes are shown in FIGS. 7 to 10. The posts in FIGS. 7 and 8 were formed using 0.7 μm square opaque regions 90% s1813, and a 5° offset angle. The alert reader will note that the 0.7 μm "square" posts are not very square, having considerably rounded tops. The bases of the posts are much less rounded than the tops of the posts. This is consistent with the rounding being due to the development process. The tops of the posts are exposed to the developer for a longer time than the bases. They are therefore more susceptible to attack. Even the unexposed resist that makes up the posts will have some finite solubility in the resist, and the effect will be to attack sharp features such as corners first. Larger posts show much less rounding off; for example FIG. 9 shows some 2 μm posts.

The other feature that is particularly obvious in FIGS. 7 and 8 is the ripples up the sides of the posts. It is thought that this is due to interference from light reflected from the substrate, since these arrays of posts were exposed by a 442 nm laser beam. The effect is much less obvious in gratings exposed with a mask aligner which uses a UV lamp that emits multiple wavelengths which are incoherent, reducing the effect of any interference. These ripples do not seem to affect the switching.

Figure 10:
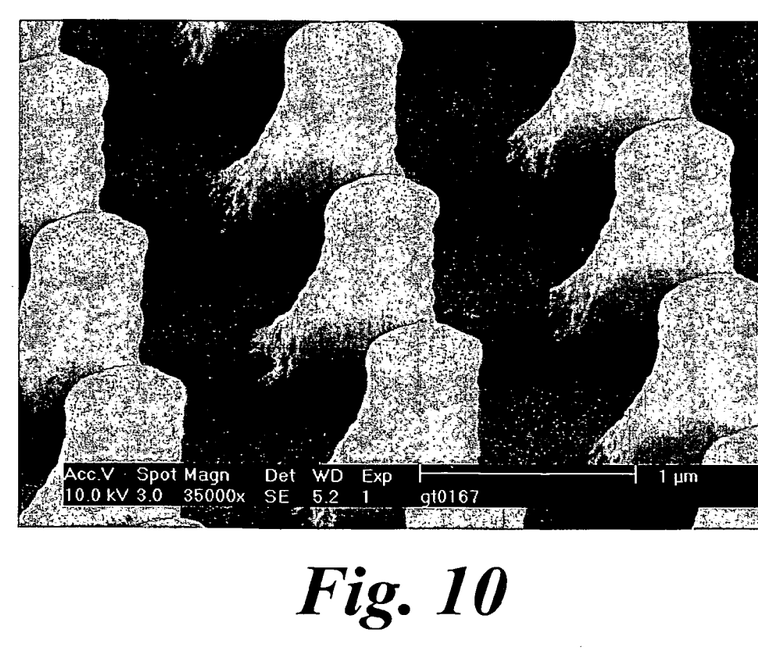

Another interesting feature from the SEMs is the absence of overhangs in even the most blazed posts, for example FIG. 10 shows some 0.7 μm posts exposed at 30 degrees without significant overhang. Again we think any overhangs would be very susceptible to attack by the developer.

Computer Simulations with Rounded Posts

Figure 11:
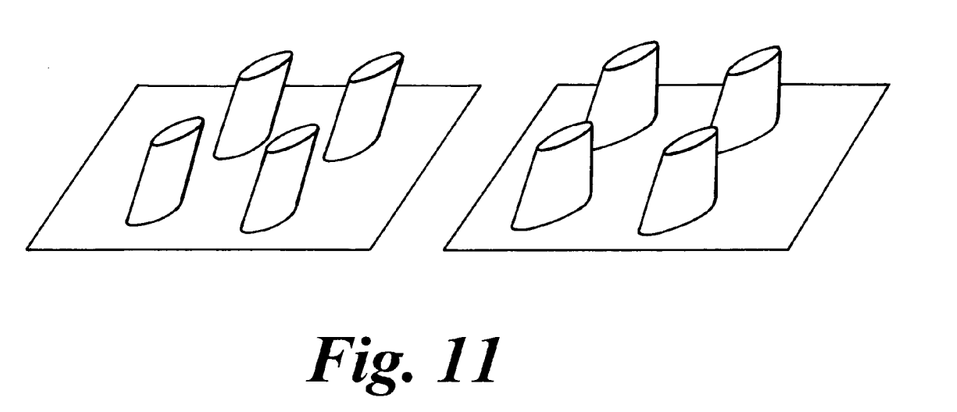
FIGS. 11 and 12 are views of different arrays of features of devices in accordance with further embodiments of the invention
Figure 12:
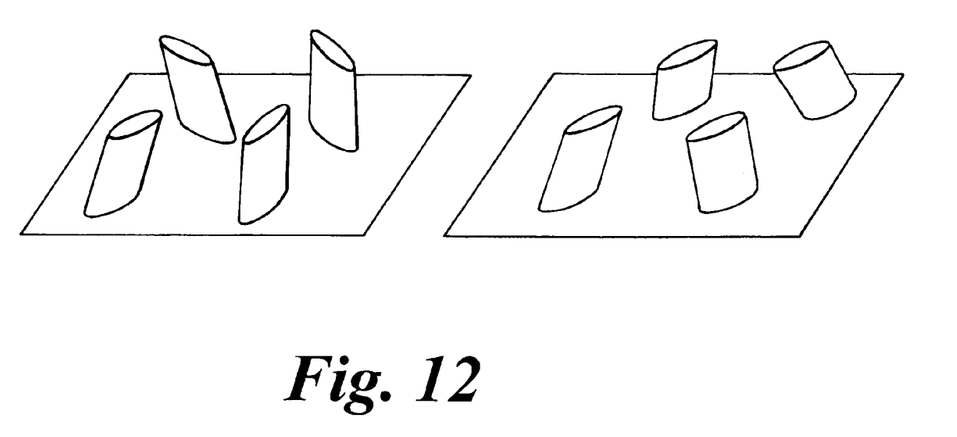

We have generated computer models that look very similar to the 0.7 μm rounded posts of FIGS. 7 and 8. Even though the posts are far from the idealised square posts that we had used in previous simulations, these more realistic posts still give the same states, aligned along the blazed diagonals, but with two different magnitudes of tilt. The energies of the two states are slightly lower than before, but the tilted state still has the lowest energy. It seems that it is not essential to have sharp edges to the posts. The two states are believed to arise because of the way that the LC is distorted around a post (as previously discussed). This will be true whatever the shape of the cross-section of the post. Even cylindrical posts should give the same two zenithal alignments. However, with cylindrical symmetry there is nothing to fix the azimuthal alignment of the LC—all directions will be degenerate. The posts need to have some asymmetry to lift this degeneracy. This could be for example an elliptical, diamond or square cross section with a small amount of blaze. Examples of elliptical posts are given in FIG. 11, those on the right hand side having an overhang. Referring now to FIG. 12, examples are shown wherein the shape and/or orientation of the posts is such as to favour only one azimuthal director orientation adjacent the posts. In the embodiment on the left side of FIG. 12, this orientation varies from post to post so as to give a scattering effect in one of the two states. In the embodiment shown on the right side of FIG. 12, the azimuthal director orientation is uniform across the display, but the tilt angle of the posts varies, which may provide a greyscale.

The invention claimed is:

1. A bistable nematic liquid crystal device comprising:
   a first cell wall and a second cell wall enclosing a layer of nematic liquid crystal material;
   electrodes for applying an electric field across at least some of the liquid crystal material;
   a surface alignment on the inner surface of at least the first cell wall providing alignment to the liquid crystal molecules;
   wherein the surface alignment comprises an array of upstanding alignment posts which have at least one of a shape and an orientation to induce a liquid crystal director adjacent the posts to adopt two different tilt angles in substantially the same azimuthal direction, so that two stable liquid crystal molecular configurations can exist after suitable electrical signals have been applied to the electrodes.

2. A device as claimed in claim 1, wherein the liquid crystal material has negative dielectric anisotropy and wherein the second cell wall has a surface alignment which induces a local homeotropic alignment of the liquid crystal director.

3. A device as claimed in claim 1, wherein the posts have a height in the range of about 0.5 to 5 μm.

4. A device as claimed in claim 1, wherein the posts have a height in the range of about 0.9 to 1.3 μm and the spacing between the cell walls is about 3 μm.

5. A device as claimed in claim 1, wherein at least part of a side wall of the posts is tilted at a tilt angle with respect to the normal to the plane of the first cell wall.

6. A device as claimed in claim 5, wherein the tilt angle is in the range of about 5 to 7°.

7. A device as claimed in claim 5, wherein the tilt angle is about 5°.

8. A device as claimed in claim 1, wherein the posts each have a width in the range of about 0.2 to 3 μm.

9. A device as claimed in claim 1, wherein the posts are arranged in one of a random or pseudorandom array.

10. A device as claimed in claim 1, wherein the posts are spaced in the range of about from 0.1 to 5 μm apart from each other.

11. A device as claimed in claim 1, wherein the liquid crystal material contains a surfactant.

12. A device as claimed in claim 1, wherein the posts are formed from at least one of a photoresist or a plastics material.

13. A device as claimed in claim 1, further including an analyser and a polariser mounted on the cell walls.

14. A device as claimed in claim 1, wherein the posts are treated with a material, excluding any material which induces homeotropic alignment in liquid crystal materials.

15. A device as claimed in claim 1, wherein the second cell wall has a surface alignment comprising an array of features which have at least one of a shape and an orientation to induce the liquid crystal director adjacent the features to adopt two different tilt angles in substantially the same azimuthal direction.

16. A device as claimed in claim 1, wherein the liquid crystal material has a pleochroic dye dissolved therein.

17. A device as claimed in claim 1, wherein at least one of the shape and the orientation of the posts is such as to favour only one azimuthal director orientation adjacent the posts, wherein the one azimuthal director orientation is the same for each post.

18. A device as claimed in claim 1, wherein at least one of the shape and the orientation of the posts is such as to favour only one azimuthal director orientation adjacent the posts, wherein the one azimuthal director orientation varies from post to post so as to give a scattering effect in one of the two stable liquid crystal molecular configurations.

19. A device as claimed in claim 1, wherein the second cell wall includes an inner surface that is provided with an alignment which induces a local liquid crystal director to adopt a planar alignment in substantially the same azimuthal direction induced by the alignment on the inner surface of the first cell wall.

20. A device as claimed in claim 1, wherein the liquid crystal director twists between the first cell wall and the second cell wall.

21. A device as claimed in claim 20, wherein the twist is induced by chiral doping of the liquid crystal material.

22. A device as claimed in claim 20, wherein the twist is induced by treatment of the second cell wall to produce one of a planar or a tilted planar alignment of the local liquid crystal director at a non-zero angle to the azimuthal direction induced by the posts on the first cell wall.

23. A device as claimed in claim 1, wherein the posts are formed from a material, excluding any material which induces homeotropic alignment in liquid crystal materials.

24. The device of claim 1, wherein the posts are cylindrical.

25. The device of claim 1, wherein the posts have a square cross section.

26. The device of claim 1, wherein the posts have a cross section selected from an oval shape and a diamond shape.

* * * * *